US007281676B1

(12) United States Patent
Bennington

(10) Patent No.: US 7,281,676 B1
(45) Date of Patent: Oct. 16, 2007

(54) SHREDDING APPARATUS AND METHOD OF CLEARING LAND THEREWITH

(76) Inventor: John T. Bennington, 12635 Bentbrook Dr., Chesterland, OH (US) 44026

( * ) Notice: Subject to any disclaimer, the term of this patent is extended or adjusted under 35 U.S.C. 154(b) by 0 days.

(21) Appl. No.: 11/207,494

(22) Filed: Aug. 19, 2005

(51) Int. Cl.
*B02C 1/10* (2006.01)

(52) U.S. Cl. ....................................... 241/294
(58) Field of Classification Search ............ 241/293, 241/294; 83/698.41, 839, 840, 841; 407/34, 407/40, 48
See application file for complete search history.

(56) References Cited

U.S. PATENT DOCUMENTS

| 3,642,214 A * | 2/1972 | Blackwell, Jr. ............ 241/191 |
| 4,162,770 A * | 7/1979 | Lewis ......................... 241/191 |
| 4,773,600 A * | 9/1988 | Metski .................. 241/101.76 |
| 5,100,070 A * | 3/1992 | Montgomery, Sr. ......... 241/294 |
| 5,873,534 A * | 2/1999 | Shinn ......................... 241/294 |
| 6,640,851 B1 | 11/2003 | Bennington .............. 144/24.12 |
| 6,698,477 B1 | 3/2004 | Bennington ................ 144/235 |
| 7,004,413 B2 * | 2/2006 | Langlois ..................... 241/242 |
| 2006/0118672 A1 * | 6/2006 | Hickey et al. ............. 241/294 |

* cited by examiner

*Primary Examiner*—Faye Francis
(74) *Attorney, Agent, or Firm*—James A. Lucas

(57) ABSTRACT

A shredding apparatus includes a shredding drum capable of quickly and effectively clearing large tracts of land. Several cutter blocks are positioned in axial rows across the periphery of the drum and are secured to the drum by welding. The blocks in each row are evenly spaced from one another and may be offset from the axial direction of the drum by angle of between about 4°°and about 10°. Each of the blocks includes a cutter tooth. Each tooth includes a shank that is removably anchored in a hole in each block. The teeth are typically reinforced with an extension projecting back from the face. The blocks are placed around the drum to enable the teeth collectively to fully sweep the ground surface during each revolution of the drum.

12 Claims, 2 Drawing Sheets

SHREDDING APPARATUS AND METHOD OF CLEARING LAND THEREWITH

FIELD OF THE INVENTION

This invention relates to the field of cutting drums useful for shredding small trees, shrubs and undergrowth. More specifically, it relates to a shredder assembly, the component parts thereof, and the use of a shredder in land clearance.

BACKGROUND OF THE INVENTION

Typically, powered devices useful for clearing debris from land may vary in size from small hand held weed trimmers to large rotatable shredding drums capable of rapidly clearing vast tracts of land. These large shredding drums typically have a plurality of cutting teeth disposed circumferentially on their outer surface. A large shredder can be powered by a chain drive, by gears or belts, or by direct drive. It may be mounted at the end of a movable boom that is driven by a diesel or gasoline engine. The shredding drum commonly encounters more than just weeds, shrubs and trees when performing its tasks. The drum may contact rocks and all manner of surface debris, such as boulders, re-bar, wire, cinder block and other materials of construction. Accordingly, the shredding operation places tremendous radial and axial stress loads on the drum, the cutting teeth, the drive shaft, and other component parts associated with the drum assembly and its operation.

BRIEF DESCRIPTION OF THE INVENTION

It is an objective of the present invention to increase the length of the in-service time intervals for a shredder.

Another objective is to reduce the time and expense for maintenance of a shredder.

Yet another objective is to provide a shredder capable of quickly and effectively clearing large areas of land.

These and other objectives and advantages will become apparent upon a reading of the description that follows.

The present invention relates to a drum assembly for a shredder. The assembly comprises a cylindrical drum having a plurality of blocks mounted around the circumference thereof and secured thereto. Each block has a leading surface and a trailing surface, two sides generally co-linear with the sides of the drum, a top surface, and a bottom surface in contact with the drum surface. The block has a V-shaped notch in the top surface, but otherwise is in the shape of a parallelepiped. Each of the blocks holds a cutting tooth.

Each of the cutting teeth has a hard, typically carbide, cutting surface. The tooth includes a shank that is removably inserted into a hole in the V-shaped notch in the cutter block. Each shank has a free end and an abutment end, the abutment end terminating in a rearwardly extending shoulder that cooperates with the block to serve as a stop to limit linear and rotational movement of the shank in the block. An extension on the tooth projects rearwardly of the tooth face and rests against the adjacent surface of a block to provide additional support for the tooth to resist shock and bending moments. Each cutter block is aligned with the rotational direction of the drum so that the cutting surface of the tooth faces at right angle to the rotational direction of the drum and parallel to the drum axis. The shank on each tooth includes a circumferential groove, and a spring clip or a spring pin engages the groove to anchor the tooth in a corresponding hole in the block.

The invention further comprises a shredder drum including a cutting tooth and block assembly adapted to be removably mounted on the circumference of the drum. The block is generally in the shape of a parallelepiped with a leading surface and a trailing surface, two coplanar sides, and a base. The top surface of the block includes a V-shaped notch with a front surface and a rear surface of the notch meeting at an angle of about 90°. A hole extends into the rear surface of the notch at a right angle to the surface. The tooth comprises a planar cutting surface adapted to form an angle generally orthogonal to the top of said block when the tooth is engaged therewith. It also includes a shank to be inserted into the hole in the rear surface of the notch, said shank having a free end and an abutment end. The abutment end terminates in a shoulder formed at right angles to the shank. The shoulder abuts the rear notch surface where it cooperates with the block to limit the linear and rotational movement of the shank within the block. An extension projects rearwardly of the tooth face and is adapted to rest against the planar top surface of a block when the tooth is inserted into the block, said extension serving to provide reinforcing support for the tooth when the shredding drum is in use. The shank typically includes a circumferentially extending groove and a lock pin engaging the groove for the purpose of providing a compressive fit of the tooth in the corresponding hole in a block. The shank forms an interior or acute angle between about 30° and about 60°, preferably about 45°, with respect to the rearward extension of the tooth. The shank forms an obtuse angle between about 120° and about 150°, preferably about 135°, with respect to the cutting face of the tooth. The angle serves to provide the proper pitch for the cutting face when the shank of the tooth is mounted in the block.

The invention also relates to a method of clearing brush and debris from land. The method comprises providing a shredding drum assembly having a cylindrical surface. A plurality of replaceable cutter blocks are secured on the drum surface. A plurality of cutting teeth are provided, each tooth having a shank with a free end and an abutment end, the abutment end terminating in a shoulder, and an extension projecting rearward of the tooth face. The shank of each cutting tooth is inserted into a hole in the block whereby the shoulder cooperates with the block to serve as a stop to limit movement of the shank into the block, and the rearward projecting extension rests against the adjacent surface of a block to provide additional support for the tooth against shock and bending moment. The drum assembly is mounted on a powered shaft to provide rotational movement to the drum. Each block is provided with a first hole to receive the cutting tooth. The tooth has a cutting surface that, when inserted into the hole, is parallel to the drum axis and faces the direction of rotation of the drum. Each block is generally in the shape of a rectangular parallelepiped having two sides, a top surface and a bottom surface orthogonal to the axis of the drum, and a front surface and a rear surface parallel to the axis of the drum. A V-shaped notch is provided in the top surface and a first hole extends into the block from the notch at right angles to one side of the notch to receive the shank of the tooth. A second hole extends into the block at right angles from one side of the block, said hole intercepting the first hole that receives a cutting tooth. Each cutting tooth is provided with a circumferentially extending groove, and an insert in the second hole intercepts the circumferentially extending groove to prevent removal of the shank of the cutting tooth from the first hole. Each tooth has a cutter face typically having a width of about 1 inch. The teeth in each row are spaced, for example, about 2½ inches apart, and the teeth in adjacent rows are axially offset by about 1¼ inch.

DETAILED DESCRIPTION OF THE INVENTION

Figure 1:
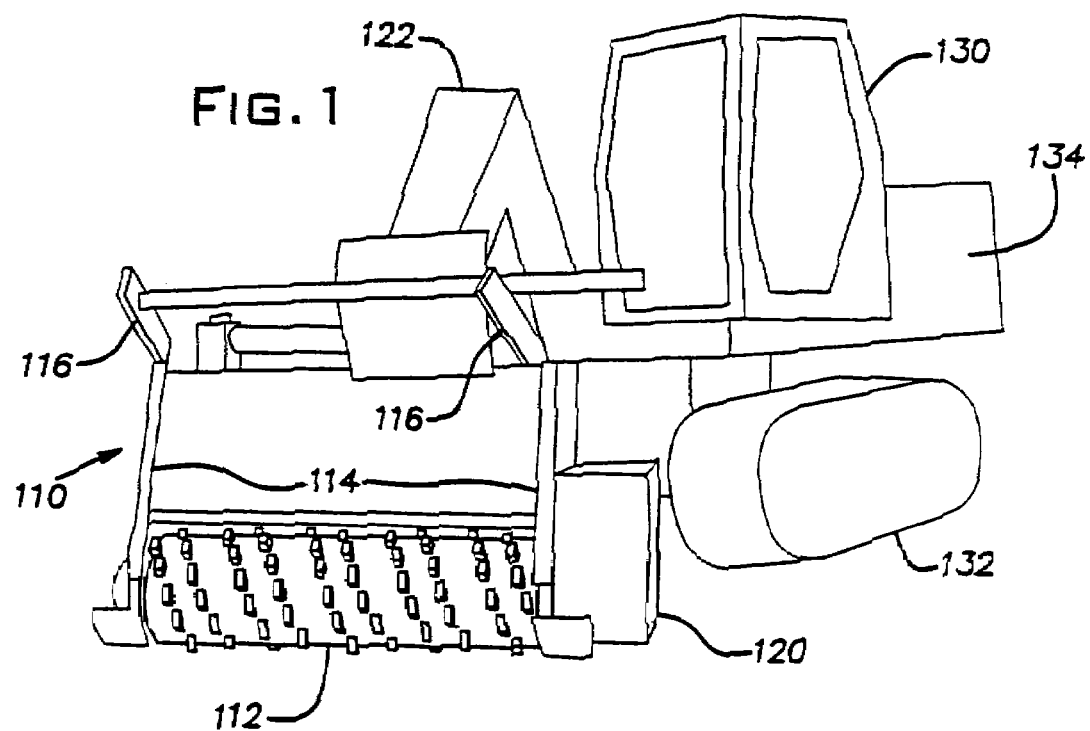
FIG. 1 is a view of the overall assembly showing the shredding drum of the present invention.

The present invention relates to a boom end shredding drum mounted on a shaft driven by a suitable power source. For purposes of illustration, the shredder may comprise a 20 inch diameter cutter drum between 60 inches and 80 inches in length, with between 80 and 110 cutter teeth mounted in cutter blocks on the drum surface. The drum is mounted on a shaft driven by an internal combustion engine, such as a 200 or 275 horsepower Cummins diesel engine. The engine is directly coupled to the shaft onto which the cutter drum is mounted, or it is joined to the shaft through a series of belts and/or gears. The engine is capable of driving the shredding drum at a rotational speed typically between about 1000 rpm and about 1200 rpm.

Shredders of this type are manufactured by Sneller Machine Co., Cleveland, Ohio, and are referred to as the Sneller Shredder 275. The drive shaft rotates in two sets of roller bearings. Because of the encounters with miscellaneous debris during shredding, the bearings are subject to tremendous lateral and axial stress. The bearings and grease seals are exposed to entanglement with wire that can become wrapped around the shaft possibly damaging or destroying the grease seals around the bearings, causing premature failure of the bearings. Furthermore, with improper tolerances and clearances between the rotating and non-rotating parts of the assembly, bearing wear can be substantial, thus necessitating shutdown and repair of the shredder. Because of the costs associated with the disassembly and repair of the equipment, and the associated non-productive time, ways are constantly being sought for reducing downtime.

The bearings used in the Sneller Shredder typically are non-adjustable, two row, tapered roller bearings having a one-piece double outer race, and two inner races. Bearings of this type are available from various manufacturers, such as The Timken Company of Canton, Ohio. To function properly, these bearings require proper lubrication. Details relating to the sealing and lubrication of the bearings are disclosed in U.S. Pat. No. 6,640,851 B1 entitled SHAFT ASSEMBLY FOR STUMP CUTTER, issued Nov. 4, 2003 to the inventor hereof. The contents of this patent are incorporated herein.

According to this patent, each bearing is lubricated by grease supplied from two separate reservoirs, each of which is designed to avoid leakage and to protect from ingress of dirt and debris. Accordingly, it is believed that the shredder can be used for 5000 hours or more without bearing failure or before fatigue spall develops. At 1000-1200 revolutions per minute, this is equivalent to at least five million revolutions.

The overall shaft assembly may be mounted within a pair of arms of a frame of the shredder. The arms in turn extend out from a boom. The frame arm and the boom also are not part of the present invention but are identified as representative of the environment in which the present invention is used.

The shaft assembly includes a shaft having a drive end connected through belts and gears to the output of the engine (none of which is shown). Next to the drive end, the shaft includes a first threaded surface that receives a nut and a lock washer. The nut and washer abut a ring on which a grease seal runs. An inboard, tapered roller bearing is pressed onto the shaft until the inner race abuts a shoulder on the shaft. An end cap is bolted or otherwise secured to a flange of an inboard cast iron shell and serves to limit any axial movement of the outer race of the bearing. The nut is threaded onto the shaft to prevent axial movement of the inner race. The outer race of the bearing is fitted into a recess formed by and between the cast iron shell and the outer plate.

The shredder drum is mounted on a rim of the inboard hub. An outboard shell made of cast iron abuts a shoulder on the shaft. The shell is supported in the second arm of the frame. An outboard hub slips around a bolt ring that abuts a shoulder of the shaft. The bolt ring is secured to the inboard hub by a plurality of bolts which draw the left-hand hub against the tapered portion of the shaft to insure a tight fit between the hub and the shaft. A slotted keyway (not shown) in the outboard hub and the shaft engages a key in a manner that is well known in the art, serving to prevent relative rotation of the outer hub with respect to the shaft. Obviously, with the two hubs bolted together, the inner hub is prevented from slippage as well. A plurality of bolts and nuts serve to secure the cutter drum between the two hubs.

The use of cast iron instead of steel for the annular inboard and outboard shells serves to prevent freeze welding of the stationary shells to the rotating steel shaft.

The outer end of the shaft receives a sleeve having a flange which abuts the shoulder on the shaft. The sleeve is prevented from relative rotation with respect to the shaft by the key engaging slots that form a keyway in the shaft and sleeve. The outer end of the sleeve is threaded on the exterior surface to receive a nut and lock washer. The outboard bearing is press fit onto the sleeve and is secured in place by the nut threaded onto the sleeve. The lock washer prevents the nut from coming loose. The use of the threaded sleeve has been found to minimize maintenance problems by reducing the likelihood of the outboard bearing becoming loose on the shaft. A loose outer bearing has been found to place a substantial additional strain on the inboard bearings and on the shaft. This can cause breakage of the shaft at the inboard end. Furthermore, any lateral forces applied through the grinder drum or hub to the shaft when the shaft is suspended only in the inboard bearing can cause serious misalignment of the shaft and damage to the drive train.

A flanged outer cap is secured to the outer shell, preferably with the use of bolts passing through the flange to protect the shaft from dirt and debris. In like manner, the cap and shell are secured to the outboard arm of the frame of the shredder using suitable fastening means, such as bolts (not shown).

Permanent lubrication is provided between the hubs and the shells by a labyrinth filled with grease. The labyrinth includes a first layer of grease in the narrow gap between the shaft and the cast iron sleeve. This gap has a radial width less than about 0.10 inch and preferably less than 0.08 inch, and is filled with grease from the labyrinth. Grease from the labyrinth also fills a gap between the shell and the axial flange of the inboard hub. This gap is less than about 0.15 inch and preferably is less than 0.125 inch. A grease seal forms the separation between the labyrinth and a grease reservoir. A double seal separates the bearing from the reservoir.

The inboard hub and the outboard hub each have an axially extending flange portion that has a width that extends at least about one inch along the axis of the shaft. This extended flange has been found to prevent cable or wire, often encountered at a construction site, from winding around the shaft and working its way into a labyrinth. It also serves to provide an improved seal to prevent the leakage of grease between the steel hubs and the cast iron shells. Maintaining a preferred clearance of 0.125 inch or less between the relatively moving parts further reduces the likelihood of leakage of grease or the ingress of dirt and debris into the labyrinth.

Turning now to the drawings, FIG. 1 shows a self powered brush shredder 110 comprising a shredder drum 112 mounted between the arms 114 of frame 116. The drum is driven by a self contained diesel engine 120. The frame 116 is mounted at the end of a hydraulic boom 122 under the control of an operator stationed in an enclosed cab 130 sitting atop a diesel engine 134 driving a pair of track treads 132.

Figure 2:
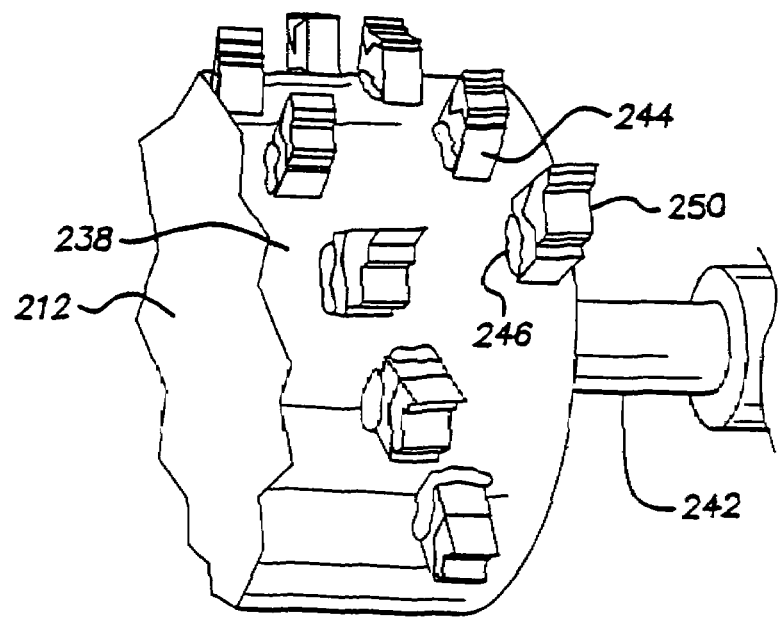
FIG. 2 is a perspective view showing an arrangement of blocks and teeth on the surface of the shredding drum.

FIG. 2 shows one end of the drum 212 and one end of the shaft 242 adapted to be mounted within the frame arms 114 (not shown) through a set of lubricated and sealed bearings as previously described. On the circumference 238 of the drum 212 are several blocks 244 that are secured to the drum, preferably by welds 246. Each of the blocks is provided with a cutting tooth 250.

Figure 3:
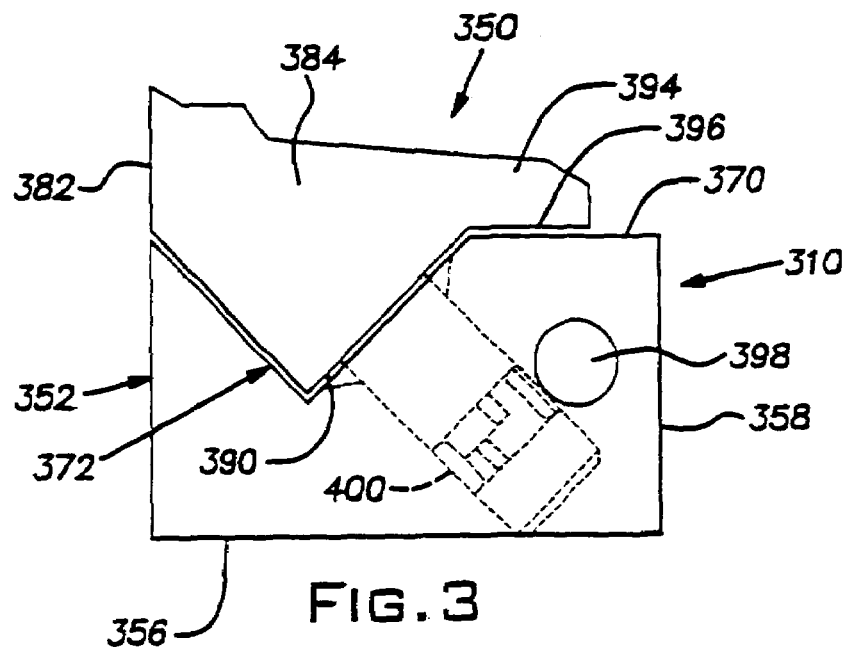
FIG. 3 shows an assembly of a cutter tooth and a block.
Figure 4:
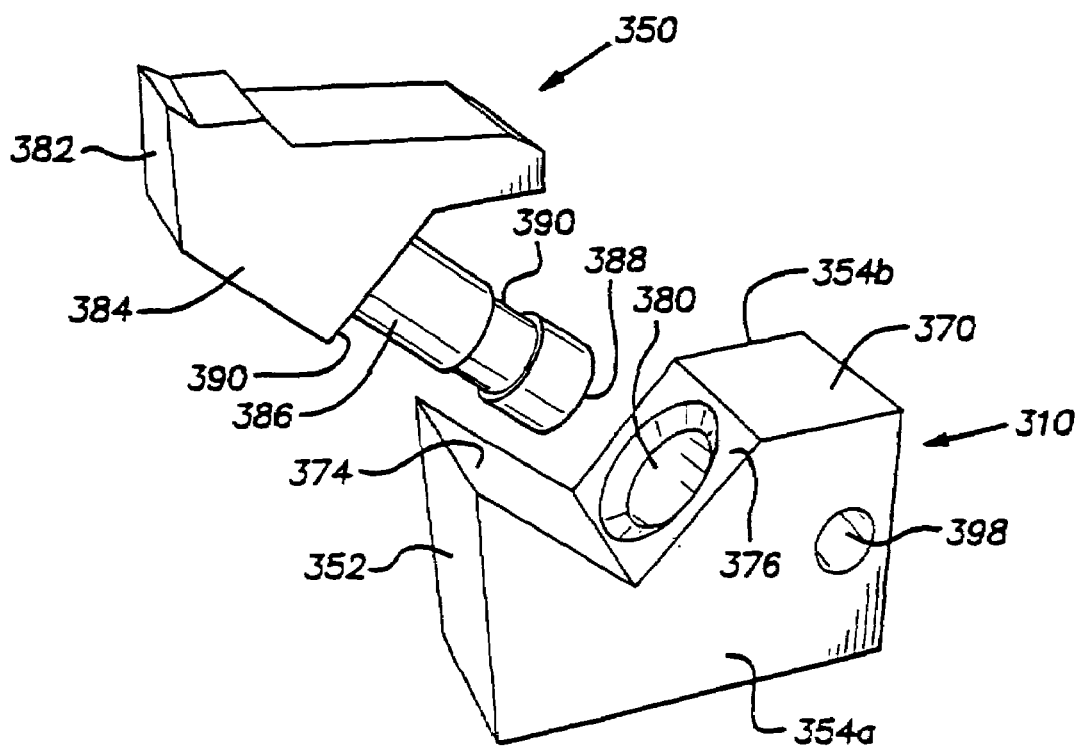
FIG. 4 is an exploded perspective view of a tooth and cutter block useful in the present invention.

FIGS. 3 and 4 show the details of a block and tooth according to the present invention. For simplicity, the same numbers will be used in both figures. The block 310 is generally rectangular with a front surface 352, two coplanar sides 354a, 354b, a base 356, a rear surface 358 and a top 370. Although the base is seen as being flat, it can also be slightly curved to conform to the contour of the cylindrical drum surface. Near the front surface 352, the top 370 of the block includes a V-shaped notch 372 with the front surface 374 and the rear surface 376 of the notch forming an angle of 90°. The intersection between the two surfaces forms a line that extends in a direction that is parallel to the axis of the drum. A hole 380 extends into the block at an angle of 90° with respect to the rear surface 376 of the notch. A second hole 398 extends between the two sides of the block, intercepting a segment of the hole 380. This second hole 398 receives a lock pin (not shown) which is used to secure the shank of a tooth in the block.

Each tooth 350 includes a planar cutting face 382, a tooth body 384, and a cylindrical shank 386 having a free end 388 and an abutment end 390 which forms a generally rectangular shoulder 392 where it intersects the body 384 of the tooth. The shank 386 typically forms an angle between about 120° and 150°, preferably about 135°, with respect to the cutting face 382 of the tooth. The shank forms an interior or acute angle between about 30° and about 60°, preferably about 45°, with respect to the rearward extension of the tooth. The shank typically includes a groove 390, which cooperates with a spring clip or a lock pin 400. The tooth 350 includes an extension 394 projecting rearward from the tooth face 382. This extension includes a planar surface 396 that rests against the top 370 of the block when the tooth shank 386 is inserted into the tooth hole 380. This gives support to the tooth and also keeps the tooth from turning in the hole 380 when the drum is rotating. A pin is driven in to the hole 398 and intercepts the groove 390 of the shank to hold the tooth securely in the block. The tooth can be removed from the block using a punch and hammer to remove the lock pin from the hole 398 in the block. The tooth can be loosened by striking the free end 388 of the shank, accessible from the back surface of the block. A block can be changed or replaced as needed by removing the block using a chisel, saw or blow torch followed by grinding of the drum face if necessary to remove residual traces of the block left on the drum.

A tooth of this general description is shown and claimed in U.S. Pat. No. 6,698,477 B1, the subject matter of which is incorporated by reference herein. The patent was issued on Mar. 2, 2004 to the instant inventor.

The blocks are mounted on the drum generally in accordance with the arrangement shown in FIG. 2 so that a 100% sweep or coverage of the terrain is obtained with each revolution of the drum. This coverage is achieved, for example, on a 20 inch diameter by 60 inch wide drum by placing 96 blocks and teeth in four rows of 24 blocks and teeth. A total sweep is achieved if each tooth has a face with a width of about 1 inch, mounted in a block having a width of 1¼ inches. The teeth in each row are spaced 2½ inches apart. The teeth in alternate rows are axially offset by 1¼ inches to provide the complete coverage. Each row extends across the perimeter of the drum from one side to the other at an axial angle between about 4° and about 10°, preferably about 7°. This facilitates the removal and replacement of a tooth in a block, and also serves to sweep debris to the side of the shredder drum as the debris is dislodged or cut. Other angles can be used as well. For example, the blocks and teeth can be aligned in a V-configuration across the drum. When using four rows, each row is spaced 90° around the face of the drum with each row parallel to one another. Obviously, with a larger or smaller diameter drum, the number of rows can be increased or decreased as appropriate, with suitable adjustments being made in the size of the blocks and the cutting face of each tooth, as well as the spacing between blocks so as to obtain complete coverage with each revolution of the drum.

The tooth is typically fabricated by suitable means, such as forging or casting. The face of the tooth preferably is made from a hard, impact resistant material, such as carbide steel brazed onto the body of the tooth. The block is generally made from steel by forging. The thickness of the wall of the drum is between about ⅜ inch and about ¾ inch. The drum may be made from hot rolled steel pipe.

Typically, the number and the placement of teeth in the cutter block, as well as the angles and height of the cutting teeth with respect to the rotational direction of the cutting drum, can be altered in accordance with established practices. For example, a wider block could accommodate more than one tooth, arranged in a staggered arrangement in the top of the block. Furthermore, other means, such as cotter pins, can be used for anchoring each tooth in a hole in the block. Likewise, the number of removable cutter blocks can be increased or decreased depending on the overall size of the drum and the blocks.

The shredder of the present invention may be assembled typically in the same manner as described in the aforementioned patents. The inboard hub is slipped into place around the tapered portion of the shaft. The cutter drum is slipped onto the rim of the hub. The outboard hub is placed around the outboard end of the shaft until it abuts the shoulder of the shaft. The hubs are then drawn together with a plurality of bolts that extend through holes aligned in the outboard hub and the drum, and that are threaded into tapped holes in the inboard hub. The shaft sub-assembly is mounted in the arms of the frame. The inboard shell is placed around the shaft.

The grease seal is inserted into place and the second grease seal is placed over the shaft. The inboard bearing is pressed onto the shaft until it abuts the shoulder on the shaft, after which the ring is threaded onto the shaft. The outer grease seal is placed therearound and the inboard end plate is bolted through the flange of the inboard sleeve into the frame arm. The lock washer is placed around the shaft and a nut is threaded onto the shaft and is tightened to anchor the inboard bearing securely in position.

In like manner, the outboard shell is placed around the shaft. The grease seal is inserted into place and an additional grease seal is placed over the shaft. The sleeve is pressed onto the outboard end of the shaft and is prevented from slipping on the shaft by a key inserted into a slotted keyway in the shaft and the sleeve. The sleeve includes a flange. The outboard bearing is pressed on the sleeve until the bearing abuts the flange and the flange on the outboard shell. A nut and lock washer secure the outboard bearing in place. This arrangement of the external threads on the sleeve and the nut to secure the outboard bearing in place unexpectedly reduces the likelihood of damage to the inboard end of the shaft.

The end cap includes a flange having a plurality of holes that match up with corresponding holes in the flange of the outboard shell and the arm of the frame. A plurality of bolts are used to secure the outboard end of the shaft assembly to the frame.

After the components have been assembled, the grease reservoir and labyrinth are filled with grease by providing grease fittings and passages extending through the bearing housings and into the reservoirs. The grease is then forced into each of the reservoirs, and from there passes through the grease seals into the labyrinths. As part of the routine maintenance of the assembly, it should be regreased on a regular basis after a few hours of operation.

While the invention has been described in combination with embodiments thereof, it is evident that many alternatives, modifications and variations will be apparent to those skilled in the art in light of the foregoing teachings. Accordingly, the invention is intended to embrace all such alternatives, modifications and variations as fall within the spirit and scope of the appended claims. For example, instead of the cutter blocks being secured to the drum surface by welding or brazing, suitable threaded fasteners may be used to secure the blocks to the drum. Furthermore, the alignment of the blocks with the drum can be achieved by using a plurality of alignment pins instead of a key and slotted keyway.

The teeth used in the teachings of the present invention can be used with other types of cutter drums, such as solid drums, with improved results. Likewise, the blocks of the present invention can be mounted on unitary cutting drums, thereby enjoying the benefit and ease of replacing the blocks when worn or broken.

What is claimed is:

1. A shredder assembly adapted for use in clearing terrain of unwanted debris and growth comprising:
   a. a drum having a cylindrical surface, said drum mounted on a drive shaft;
   b. a plurality of blocks mounted on the cylindrical surface of the drum, each block being generally in the shape of a rectangular parallelepiped having two sides, a top surface and a bottom surface orthogonal to the shaft axis, and a front surface and a rear surface parallel to the axis of the shaft, each block further including a V-shaped notch in the top surface, and a first hole extending into the block from the notch and at right angles to one side of the notch; and
   c. a cutting tooth having a shank engaging said first hole in each block and having a cutting surface that, when so engaged, is parallel to the drive shaft, and faces the direction of the rotation drum.

2. The shedder assembly according to claim 1 wherein each block includes a second hole extending into the block from one side and at right angles thereto, said hole intercepting the first hole that receives a cutting tooth, said cutting tooth including a circumferentially extending groove, the assembly further including an insert received in the second hole intercepting the circumferentially extending groove to prevent removal of the shank of the cutting tooth from the first hole.

3. The shredder assembly according to claim 1 wherein the drum is mounted on a shaft driven by an internal combustion engine capable of driving the drum at a rotational speed of about 1000 rpm to about 1200 rpm.

4. A shredder drum for use in clearing land, said drum having a cylindrical surface and including:
   a. a plurality of blocks mounted on the cylindrical surface of the drum, each block generally in the shape of a rectangular parallelepiped having two sides, a top surface and a bottom surface orthogonal to the axis of the drum, and a front surface and a rear surface parallel to the drum axis, each said block including a V-shaped notch in said top surface, and a first hole extending into the block from the notch at right angles to one side of the notch to receive a cutting tooth; and
   b. a tooth having a shank engaging said first hole in each block, the tooth having a cutting surface that is parallel to the drum axis, and faces the direction of rotation of the drum when the shank is engaged in said first hole.

5. The shredder drum according to claim 4 wherein the drum is made from steel and has a wall thickness of between about ⅜ inch and ¾ inch.

6. The shredder drum according to claim 5 wherein each block is secured to the drum with at least one weld.

7. The shredder drum according to claim 5 wherein each block includes a second hole extending into the block from one side and at right angles thereto, said hole intercepting the first hole that receives a cutting tooth, said cutting tooth including a circumferentially extending groove, the drum further including an insert received in the second hole intercepting the circumferentially extending groove to prevent removal of the shank of the cutting tooth from the first hole.

8. The shredder drum assembly according to claim 7 wherein the insert comprises lock pin.

9. The shredder drum according to claim 4 wherein the blocks are evenly spaced across the width of the drum in a plurality of rows whereby the teeth provide a complete sweep of the ground during each revolution of the drum.

10. The shredder drum according to claim 9 wherein the blocks in each row are offset from one another by an angle of about 4° to about 10° with respect to the axis of the drum.

11. The shredder drum according to claim 10 wherein the drum has a diameter of about 20 inches, and the blocks are arranged in four rows evenly spaced around the circumference of the drum.

12. The shredder drum according to claim 11 wherein the teeth each have a cutter face having a width of about one inch, the teeth in each row are spaced about 2-½ inches apart, and the teeth in alternate rows are axially offset by about 1-¼ inches.

* * * * *